3,556,900
BEAD-RING APPLICATOR
Walter James Edney, Birmingham, and John F. Askam, Sutton Coldfield, England, assignors to Dunlop Company Limited, London, England, a British company
Filed Mar. 8, 1968, Ser. No. 711,726
Claims priority, application Great Britain, Mar. 17, 1967, 12,613/67
Int. Cl. B29h 17/22
U.S. Cl. 156—403                                5 Claims

ABSTRACT OF THE DISCLOSURE

A bead-ring applicator for a tire building machine comprises an applicator shaft which projects coaxially from the end of a tire building drum shaft in the form of a cantilever, six bead-ring carrying arms supported on the applicator shaft, which may be collapsed inwardly from and reerected to a ring supporting disposition to facilitate transfer of the bead-ring from the applicator to the tire and also to facilitate removal of the finished tire, and means for reciprocating the applicator shaft.

---

This invention relates to the manufacture of pneumatic tires.

In the manufacture of pneumatic tires it is necessary to apply coaxially to tire building ply fabric, mounted on a building drum, a pair of bead wires, this operation being followed by the turn-up of the plies around them to secure them in position. In previously designed machines, bead wire applicators have been used, the applicator being mounted axially outwardly of the drum on a pedestal support, sufficient clearance having to be provided between the pedestal support and the drum to enable a fully constructed tire to be removed from the drum. In another arrangement the bead wire applicator is pivotable out of a coaxial position with respect to the drum to a position clear of the drum to enable axial removal therefrom of a fully constructed tire.

It is an object of the present invention to provide a novel bead-ring applicator of a compact and simple design.

According to the invention a bead-ring applicator for a tire building machine comprises a shaft for carrying a tire building drum, an applicator shaft projecting coaxially from the end of the tire building drum shaft in the form of a cantilever, a plurality of bead-ring-carrying arms supported on the applicator shaft collapsible inwardly from and reerectable to a ring-supporting disposition, means for collapsing the arms and means for reciprocating the applicator shaft relative to the shaft for the tire building drum.

The means for collapsing the arms may comprise a central gear wheel in engagement with a plurality of planetary gear wheels, one attached to each arm, the arrangement being such that, upon rotation of the central gear wheel, the planetary gear wheels are rotated to collapse the arms inwardly or to erect them.

One embodiment of the invention will now be described, by way of example, with reference to the accompanying drawing wherein.

Figure 1:
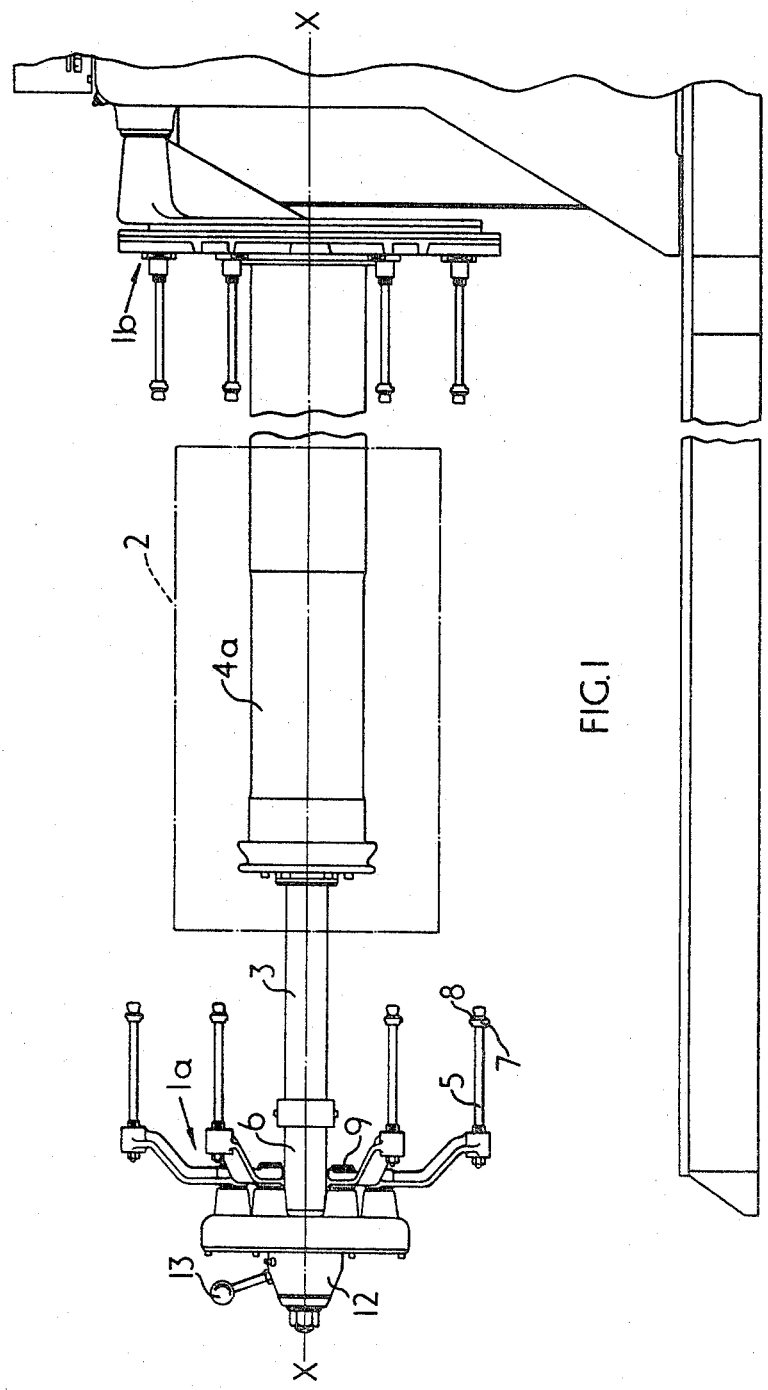
FIG. 1 is a side view of the apparatus showing a tire building machine.
Figure 2:
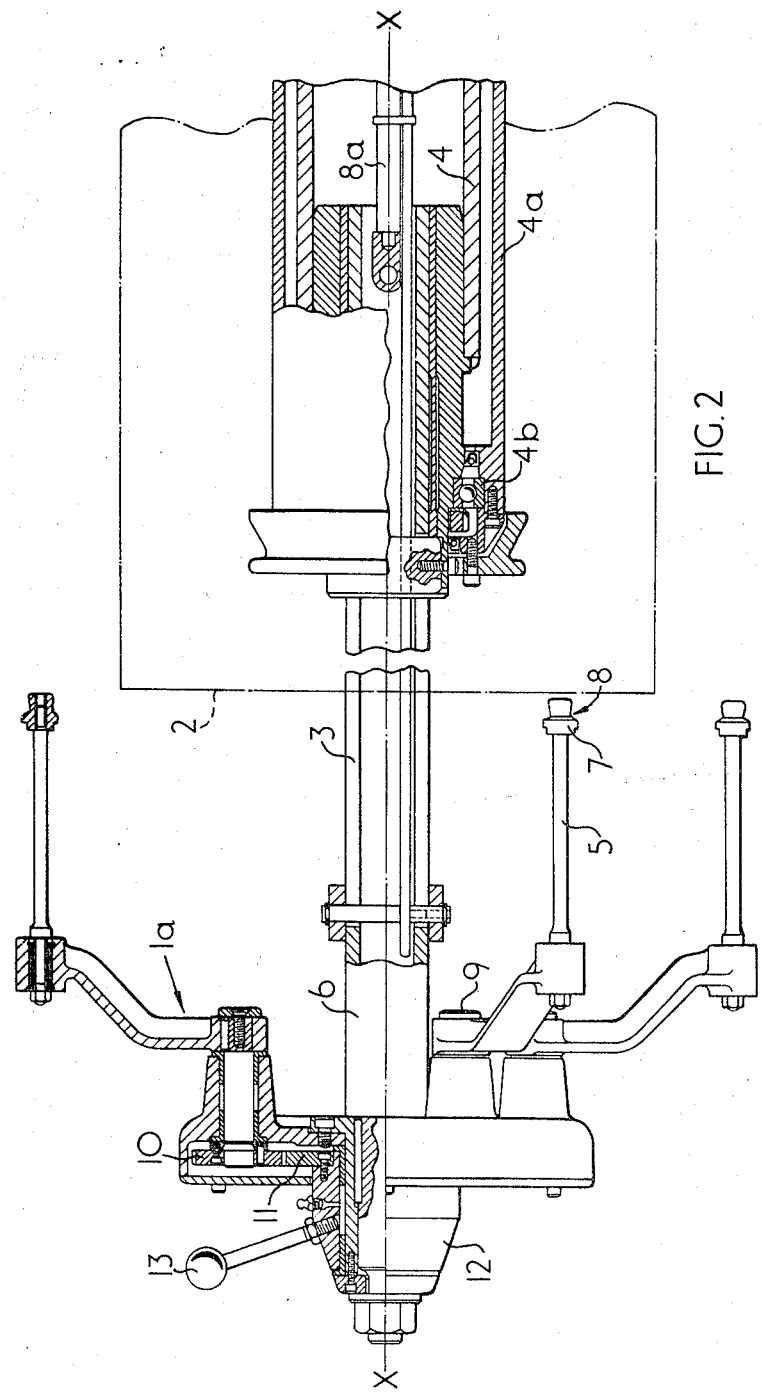
FIG. 2 is detailed part-cross-sectional side view of the bead-ring applicator and shaft.

A bead-ring applicator 1(a) forms a cantilever attachment to a tire building drum 2, the applicator shaft 3 being axially slidably coaxially within a hollow fixed shaft 4 surrounded by a rotatable tubular shaft 4(a), mounted upon bearings 4(b), upon which a rotatable tire building drum 2 (shown chain dotted) is mounted.

Six bead-ring-carrying arms 5 are rotatably mounted on a support 6 attached to the end of the applicator shaft 3, the arms at their free ends each carrying a head 7 provided with a recess 8 into which a ring will fit and be gripped when the arms are rotated to their radially outermost position.

The applicator shaft 3 is reciprocable by means of a piston and cylinder mechanism (the piston 8(a) only being shown) to move the arms carrying the bead wire towards and away from the shoulder of the tire building drum and locate a bead wire coaxially in position with the tire building ply fabric mounted on the drum.

The rotatable mounting of the arms on the support is effected by means of shafts 9, one for each arm, each mounted on an axis parallel to the axis X of the applicator shaft, each arm shaft carrying at its end remote from the arm a planetary spur gear 10 the teeth of which are in engagement with the teeth of a central gear wheel 11 mounted coaxially with the applicator shaft. The central gear is attached to a hub 12 with a substantially radially extending lever 13 attached to it, movement of the lever to rotate the hub rotating the central gear wheel which itself rotates each of the planetary gear wheels by an equal amount simultaneously to move the arms outwardly into a bead-ring gripping position or to collapse them inwardly when it is desired to pass a bead wire over the cantilever assembly and to locate it on the arms or when it is desired to remove a constructed tire from the building drum.

The bead applicator just described is suitable for applying bead wires to one end of a tire building drum, i.e., the outboard end. An inboard bead applicator 1(b) is utilised for the other end of the drum but little design difficulty is encountered with this applicator since the machine head is available for supporting the applicator and since the finished tire does not have to be passed over the applicator arms.

We claim:
1. An applicator for applying a bead-ring over tire building fabric mounted on a tire building drum comprising a shaft for carrying said tire building drum, an applicator shaft projecting coaxially from an end of the tire building drum shaft in the form of a cantilever, a plurality of bead-ring-carrying arms supported on said applicator shaft and moveable radially of said applicator shaft between a ring application position permitting transfer of a bead-ring held by said bead-ring-carrying arms to said tire building fabric mounted on said drum, and a collapsed position allowing removal of said tire building fabric having said bead-ring applied thereto from said drum and over and clear of said bead-ring-carrying arms, means for selectively moving said bead-ring-carrying arms between said ring application position and said collapsed position and means for axially reciprocating said bead-ring-carrying arms relative to said tire building drum.

2. An applicator according to claim 1 wherein said means for selectively moving said bead-ring arms between said ring application and collapsed positions comprises a central gear wheel, a plurality of planetary gear wheels in engagement with the said central gear wheel, one attached to each arm, the arrangement being such that upon rotation of the central gear wheel the planetary gear wheels are rotated to collapse the arms inwardly or to erect them.

3. An applicator according to claim 1 wherein there are six bead-ring-carrying arms.

4. An applicator according to claim 1 wherein said bead-ring-carrying arms each include a head located at a free end, said head having a recess formed therein and arranged to grip said bead-ring when said arms are in said ring application position.

5. An applicator according to claim 1 wherein said means for reciprocating the bead-ring applicator relative to the tire building drum is a piston and cylinder mechanism.

References Cited

UNITED STATES PATENTS

| | | | |
|---|---|---|---|
| 2,477,718 | 8/1949 | Breth | 156—403 |
| 2,931,420 | 4/1960 | Parr et al. | 156—403UX |

BENJAMIN A. BORCHELT, Primary Examiner

S. C. BENTLEY, Assistant Examiner